(12) United States Patent
Raisch

(10) Patent No.: US 10,240,668 B2
(45) Date of Patent: Mar. 26, 2019

(54) TRANSMISSION ASSEMBLY

(71) Applicant: Deere & Company, Moline, IL (US)

(72) Inventor: Stefan Raisch, Vaihingen/Enz (DE)

(73) Assignee: Deere & Company, Moline, IL (US)

( * ) Notice: Subject to any disclaimer, the term of this patent is extended or adjusted under 35 U.S.C. 154(b) by 89 days.

(21) Appl. No.: 15/190,352

(22) Filed: Jun. 23, 2016

(65) Prior Publication Data

US 2016/0377155 A1 Dec. 29, 2016

(30) Foreign Application Priority Data

Jun. 25, 2015 (DE) .......................... 10 2015 211 809

(51) Int. Cl.
*F16H 37/04* (2006.01)
*F16H 3/00* (2006.01)
*F16H 3/08* (2006.01)

(52) U.S. Cl.
CPC ........... *F16H 37/042* (2013.01); *F16H 3/006* (2013.01); *F16H 37/046* (2013.01); *F16H 2003/007* (2013.01); *F16H 2003/0807* (2013.01); *F16H 2003/0826* (2013.01); *F16H 2200/0078* (2013.01); *F16H 2200/0082* (2013.01); *F16H 2200/2005* (2013.01); *F16H 2200/2023* (2013.01)

(58) Field of Classification Search
CPC ...... F16H 37/046; F16H 37/042; F16H 3/006; F16H 2003/007; F16H 3/093; F16H 2003/0826; F16H 2200/2007; F16H 2200/2023

See application file for complete search history.

(56) References Cited

U.S. PATENT DOCUMENTS

| | | | | |
|---|---|---|---|---|
| 4,658,672 A * | 4/1987 | Michael | .................. | F16H 3/663 475/280 |
| 6,893,373 B2 * | 5/2005 | Kawamoto | ............. | F16H 3/666 475/302 |
| 8,262,530 B2 * | 9/2012 | Bailly | ..................... | F16H 3/728 475/217 |

(Continued)

FOREIGN PATENT DOCUMENTS

| | | |
|---|---|---|
| DE | 102006058831 A1 | 7/2007 |
| DE | 102006054281 A1 | 6/2008 |

(Continued)

OTHER PUBLICATIONS

German Search report in foreign counterpart case No. 102105211809.6 dated Jul. 7, 2016 (8 pages).

(Continued)

*Primary Examiner* — Stacey A Fluhart
(74) *Attorney, Agent, or Firm* — Klintworth & Rozenblat IP LLP

(57) ABSTRACT

A transmission assembly for a drive train of a vehicle for connecting a drive motor to a traction drive of the vehicle, includes a main shift transmission with multiple transmission-ratio stages, wherein multiple shift states of the main shift transmission can be connected by a shifting, as required, by means of shift points of one or more transmission-ratio stages, and a planetary gear, wherein the main shift transmission and the planetary gear are drivingly connected or can be connected as required to each other by means of two connection shafts.

7 Claims, 15 Drawing Sheets

(56) References Cited

U.S. PATENT DOCUMENTS

| | | | |
|---|---|---|---|
| 2003/0148847 A1 | 8/2003 | Kawamoto et al. | |
| 2008/0085801 A1* | 4/2008 | Sedoni | B60K 17/28 |
| | | | 475/72 |
| 2011/0111909 A1* | 5/2011 | Kim | B60K 6/365 |
| | | | 475/5 |

FOREIGN PATENT DOCUMENTS

| | | |
|---|---|---|
| DE | 102012221881 A1 | 6/2013 |
| EP | 1367296 A1 | 12/2003 |
| WO | 2013152892 A1 | 10/2013 |

OTHER PUBLICATIONS

European Search Report in foreign counterpart application No. 16175537.6, dated Nov. 3, 2016 (9 pages).

* cited by examiner

| Gear Total | Transmission ratio stage 50 | Shift points in 40 | | | Shift points in 50 | | | | |
|---|---|---|---|---|---|---|---|---|---|
| | | $42_1$ | $42_2$ | $42_3$ | $72_2$ | $62_2$ | $72_1$ | $62_1$ | 76 |
| 1 | 0 (6-7-1) | | | X | $74_2$ | N | $70_1$ | $60_1$ | N |
| 2 | a | | X | | $74_2$ | N | $70_1$ | $60_1$ | N |
| 3 | 1 | X | | | $74_2$ | | | | |
| 4 | a | | X | | $74_2$ | $66_1$ | | | |
| 5 | 2 | | | X | | $66_1$ | | | |
| 6 | a | | X | | $74_1$ | $66_1$ | | | |
| 7 | 3 | X | | | $74_1$ | | | | |
| 8 | a | | X | | $74_1$ | $66_2$ | | | |
| 9 | 4 | | | X | | $66_2$ | | | |
| 10 | a | | X | | | $66_2$ | $70_2$ | | 76_1 |
| 11 | 5 | X | | | | | $70_2$ | | 76_1 |
| 12 | a | | X | | | | $70_2$ | $60_1$ | 76_1 |
| 13 | 6 | | | X | | | | $60_1$ | 76_1 |
| 14 | a | | X | | | | $70_1$ | $60_1$ | 76_1 |
| 15 | 7 | X | | | | | $70_1$ | | 76_1 |
| 16 | a | | X | | | | $70_1$ | $60_2$ | 76_1 |
| 17 | 8 | | | X | | | | $60_2$ | 76_1 |
| R1 | 5-R | X | | | | | $70_2$ | | 76_2 |
| R2 | a | | X | | | | $70_2$ | $60_1$ | 76_2 |
| R3 | 6-R | | | X | | | | $60_1$ | 76_2 |
| R4 | a | | X | | | | $70_1$ | $60_1$ | 76_2 |
| R5 | 7-R | X | | | | | $70_1$ | | 76_2 |
| R6 | a | | X | | | | $70_1$ | $60_2$ | 76_2 |
| R7 | 8-R | | | X | | | | $60_2$ | 76_2 |

FIG. 7

| Gear Total | Transmission ratio stage 50 | Shift points in 40 | | | Shift points in 50 | | | | |
|---|---|---|---|---|---|---|---|---|---|
| | | $42_1$ | $42_2$ | $42_3$ | $72_2$ | $62_2$ | $72_1$ | $62_1$ | 76 |
| 1 | 0 (6-7-1) | | × | × | $74_2$ | N | $70_1$ | $60_1$ | N |
| 2 | a | × | | × | $74_2$ | N | $70_1$ | $60_1$ | N |
| 3 | 1 | × | × | | $74_2$ | | | | |
| 4 | a | × | | × | $74_2$ | $66_1$ | | | |
| 5 | 2 | | × | × | | $66_1$ | | | |
| 6 | a | × | | × | $74_1$ | $66_1$ | | | |
| 7 | 3 | × | × | | $74_1$ | | | | |
| 8 | a | × | | × | $74_1$ | $66_2$ | | | |
| 9 | 4 | | × | × | | $66_2$ | | | |
| 10 | a | × | | × | | $66_2$ | $70_2$ | | 76_1 |
| 11 | 5 | × | × | | | | $70_2$ | | 76_1 |
| 12 | a | × | | × | | | $70_2$ | $60_1$ | 76_1 |
| 13 | 6 | | × | × | | | | $60_1$ | 76_1 |
| 14 | a | × | | × | | | $70_1$ | $60_1$ | 76_1 |
| 15 | 7 | × | × | | | | $70_1$ | | 76_1 |
| 16 | a | × | | × | | | $70_1$ | $60_2$ | 76_1 |
| 17 | 8 | | × | × | | | | $60_2$ | 76_1 |
| R1 | 5-R | × | × | | | | $70_2$ | | 76_2 |
| R2 | a | × | | × | | | $70_2$ | $60_1$ | 76_2 |
| R3 | 6-R | | × | × | | | | $60_1$ | 76_2 |
| R4 | a | × | | × | | | $70_1$ | $60_1$ | 76_2 |
| R5 | 7-R | × | × | | | | $70_1$ | | 76_2 |
| R6 | a | × | | × | | | $70_1$ | $60_2$ | 76_2 |
| R7 | 8-R | | × | × | | | | $60_2$ | 76_2 |

FIG. 8

| Gear Total | Transmission ratio stage 50 | Shift points in 40 | | | | Shift points in 50 | | | | |
|---|---|---|---|---|---|---|---|---|---|---|
| | | $42_1$ | $42_2$ | $42_3$ | $42_4$ | $72_2$ | $62_2$ | $72_1$ | $62_1$ | 76 |
| 1 | 0 (6-7-1) | | X | X | X | $74_2$ | N | $70_1$ | $60_1$ | N |
| 2 | b | X | | X | X | $74_2$ | N | $70_1$ | $60_1$ | N |
| 3 | a | X | X | | X | $74_2$ | N | $70_1$ | $60_1$ | N |
| 4 | 1 | X | X | X | | $74_2$ | | | | |
| 5 | a | X | X | | X | $74_2$ | $66_1$ | | | |
| 6 | b | X | | X | X | $74_2$ | $66_1$ | | | |
| 7 | 2 | | X | X | X | | $66_1$ | | | |
| 8 | b | X | | X | X | $74_1$ | $66_1$ | | | |
| 9 | a | X | X | | X | $74_1$ | $66_1$ | | | |
| 10 | 3 | X | X | X | | $74_1$ | | | | |
| 11 | a | X | X | | X | | $66_2$ | | | |
| 12 | b | X | | X | X | | $66_2$ | | | |
| 13 | 4 | | X | X | X | | $66_2$ | | | |
| 14 | b | X | | X | X | | $66_2$ | $70_2$ | | 76_1 |
| 15 | a | X | X | | X | | $66_2$ | $70_2$ | | 76_1 |
| 16 | 5 | X | X | X | | | | $70_2$ | | 76_1 |
| 17 | a | X | X | | X | | | $70_2$ | $60_1$ | 76_1 |
| 18 | b | X | | X | X | | | $70_2$ | $60_1$ | 76_1 |
| 19 | 6 | | X | X | X | | | | $60_1$ | 76_1 |
| 20 | b | X | | X | X | | | $70_1$ | $60_1$ | 76_1 |
| 21 | a | X | X | | X | | | $70_1$ | $60_1$ | 76_1 |
| 22 | 7 | X | X | X | | | | $70_1$ | | 76_1 |
| 23 | a | X | X | | X | | | $70_1$ | $60_2$ | 76_1 |
| 24 | b | X | | X | X | | | $70_1$ | $60_2$ | 76_1 |
| 25 | 8 | | X | X | X | | | | $60_2$ | 76_1 |
| R1 | 5-R | X | X | X | | | | $70_2$ | | 76_2 |
| R2 | a | X | X | | X | | | $70_2$ | $60_1$ | 76_2 |
| R3 | b | X | | X | X | | | $70_2$ | $60_1$ | 76_2 |
| R4 | 6-R | | X | X | X | | | | $60_1$ | 76_2 |
| R5 | b | X | | X | X | | | $70_1$ | $60_1$ | 76_2 |
| R6 | a | X | X | | X | | | $70_1$ | $60_1$ | 76_2 |
| R7 | 7-R | X | X | X | | | | $70_1$ | | 76_2 |
| R8 | a | X | X | | X | | | $70_1$ | $60_2$ | 76_2 |
| R9 | b | X | | X | X | | | $70_1$ | $60_2$ | 76_2 |
| R10 | 8-R | | X | X | X | | | | $60_2$ | 76_2 |

FIG. 13

TRANSMISSION ASSEMBLY

CROSS-REFERENCE TO RELATED APPLICATIONS

Pursuant to 35 USC § 119, this application claims the benefit of and priority to German patent application no. 102015211809.6, filed on Jun. 25, 2015, which is herein incorporated by reference in its entirety.

FIELD OF THE DISCLOSURE

The disclosure relates to a transmission assembly for a drive train of a vehicle for connecting a drive motor to a traction drive of the vehicle.

BACKGROUND

EP 1 367 296 A1 shows such an assembly, which is suitable primarily for the drive train of a passenger car or a light-duty commercial vehicle. In larger and heavy-duty commercial vehicles, for example, tractors, however, the decisive factor is that transmission assemblies are designed such that a large transmission-ratio spread is guaranteed simultaneously with a low mass inertia to be synchronized. A high transmission-ratio spread has the result that the lower gears must have a high transmission ratio. In addition, the requirement for a low mass inertia to be synchronized means, with respect to the design with a minimum-to-maximum stress ratio, the lowest possible rotational speeds of the rotating components of the transmission assembly. Consequently, there is the problem of providing a transmission assembly that at least partially takes these requirements into account.

SUMMARY

The problem is solved by a transmission assembly for a drive train of a vehicle for connecting a drive motor with a traction drive of the vehicle, including a main shift transmission with multiple transmission-ratio stages, wherein multiple shift states of the main shift transmission can be connected by a shifting, as required, by means of shift points of one or more transmission-ratio stages, and a planetary gear, wherein the main shift transmission and the planetary gear are drivingly connected or can be connected as required to each other by means of two connection shafts and wherein, in one or more shift states of the main shift transmission, a flow of power runs from the drive motor in at least one section of the transmission assembly via multiple branched power paths to the traction drive, wherein, in at least one shift state, the flow of power runs in at least one of the branched power paths via at least two shift points.

Through the transmission assembly according to the disclosure, a large transmission ratio of the lower gears can be realized for simultaneously not too large rotational speeds and mass inertias of the rotating components, so that short shifting times are achieved when changing between gears. Furthermore, advantageously, at least two shift points are to be provided in the flow of power, because in this way additional gears or transmission stages can be generated by a winding path of the flow of forces through the transmission assembly. Furthermore, by means of the second shift point, group gears within a sub-transmission of the main shift transmission can also be generated. Finally, a transmission with good efficiency is produced.

In some embodiments, the shift points are constructed as positive-locking shift points. In this way, good efficiency and low wear are guaranteed. In addition, this assembly is more cost-effective and smaller and no holding energy is required, that is, energy is required only for shifting and not to hold the engaged state.

According to some embodiments, in one or more of the shift states, the flow of power runs in at least one of the branched power paths from one of the connection shafts to the other connection shaft. In this way, at least a so-called winding path gear is provided. In one or more of these embodiments, the flow of power runs from one of the connection shafts via at least one transmission stage to the other connection shaft.

The planetary gear may include four connection interfaces, of which the first and the second connection interfaces can each be connected to the outside by means of a shift point to a connection shaft of the transmission assembly, and the third connection interface is connected or can be connected as required to one of the two connection shafts of the main shift transmission, and the fourth connection interface is connected to the other of the two connection shafts of the main shift transmission. Here, "can be connected to the outside" means that, from the viewpoint of the transmission assembly, there is either a connection to the drive motor or to the downstream traction drive.

In some embodiments, the third connection interface can be connected via a shift interface to one of the two connection shafts of the main shift transmission and the fourth connection interface can be connected via a shift point to the other of the two connection shafts of the main shift transmission. In this way, a transmission is provided that can be shifted under a full load.

In some embodiments, the main shift transmission is constructed as a parallel shift transmission. In one or more of these embodiments, the main shift transmission is designed with a speed-reducer construction with two speed-reducer shafts.

BRIEF DESCRIPTION OF THE DRAWINGS

The transmission assembly according to the disclosure is described with reference to the following figures. Shown herein are.

DETAILED DESCRIPTION

Figure 1:
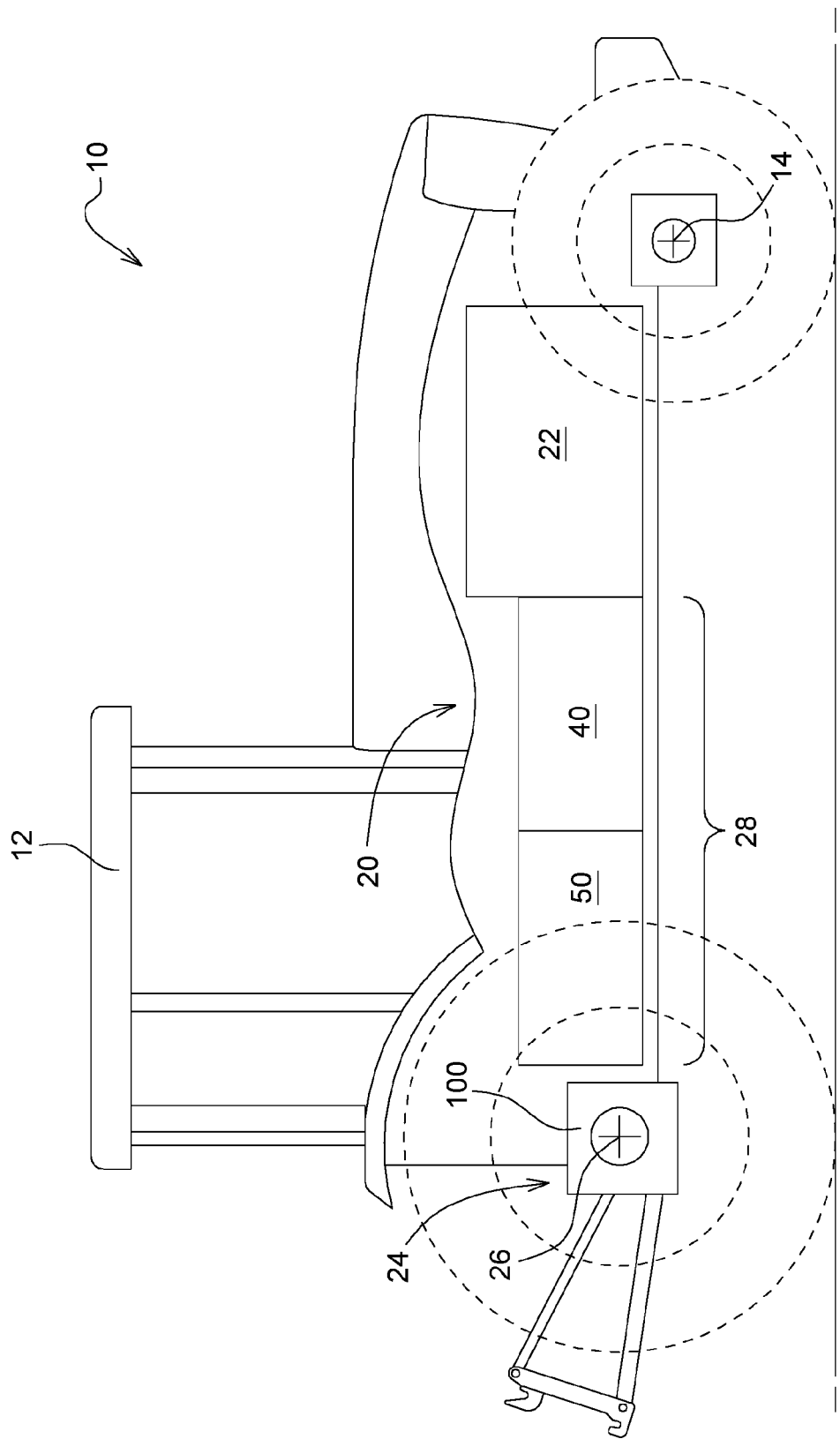
FIG. 1 an agricultural work vehicle with a drive train that includes a transmission assembly according to the disclosure.

FIG. 1 shows a vehicle 10 in the construction of a tractor with a cabin 12 and a drive train 20 in one possible design. The drive train 20 includes a drive motor 22 that can be constructed as an internal combustion engine, a transmission assembly 28, and a traction drive 24. The traction drive 24 includes, in turn, an axle transmission 100 and a permanently driven vehicle axle that can be, for example, a rear vehicle axle 26. In addition, the traction drive 24 can include a front vehicle axle 14 that is driven as required.

The transmission assembly 28 includes, in one simple construction, a planetary gear 40 and a main shift transmission 50 that can be constructed as a parallel shift transmission or double clutch transmission. Here, from the viewpoint of a flow of power from the drive motor 22 to the traction drive 24, the planetary gear 40 can be arranged in front of or behind the main shift transmission 50. Furthermore, the transmission assembly 28 can include a not-shown reversing transmission, also called a reverse gear unit. An illustration of the output of the front wheel drive that can be switched on as required was eliminated from the transmission assembly 28.

Figure 2:
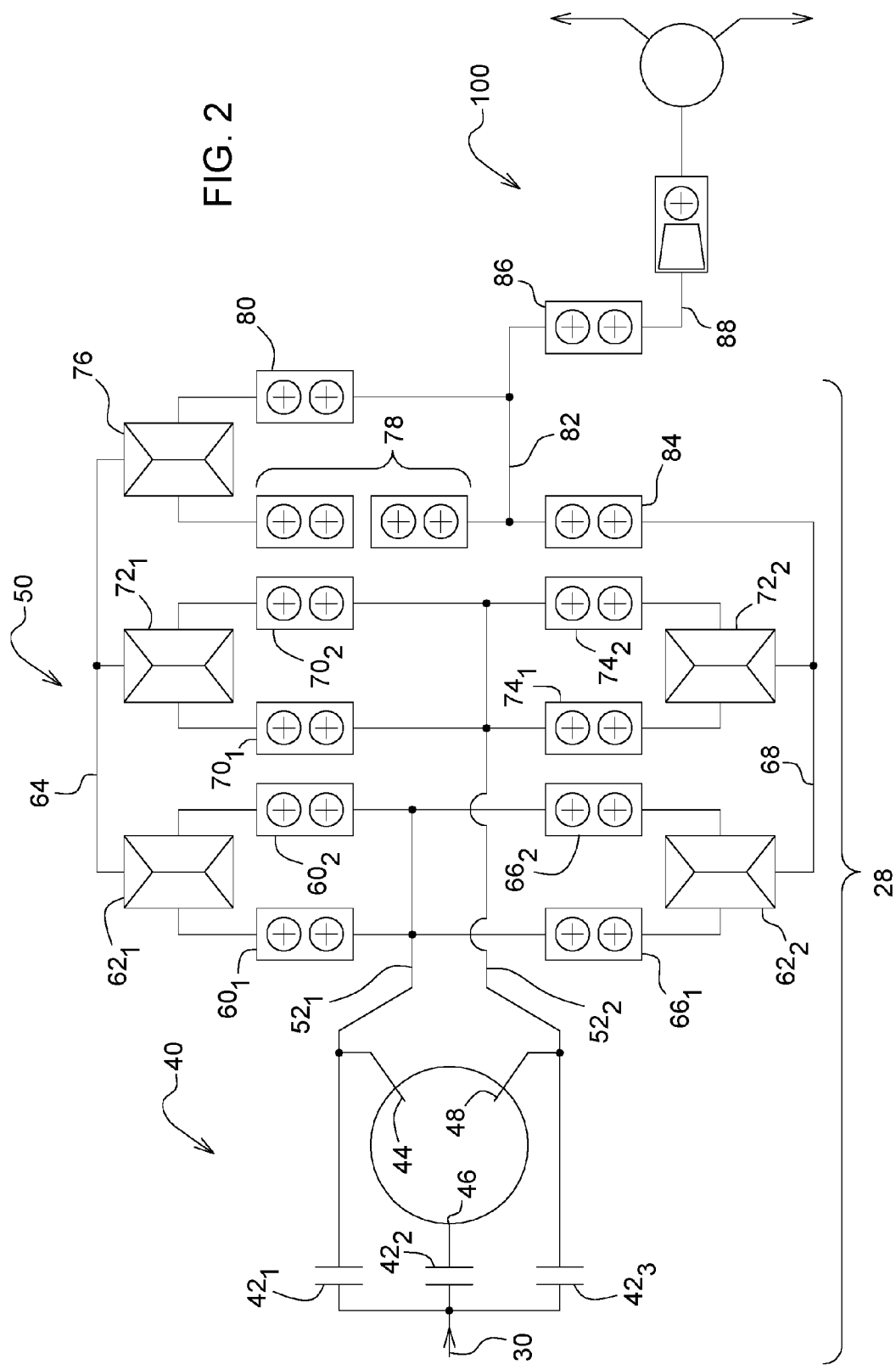
FIG. 2 a block diagram of a transmission assembly according to the disclosure in a first embodiment, FIG. 3 a block diagram of a transmission assembly according to the disclosure in a second embodiment, FIG. 4 a block diagram of a transmission assembly according to the disclosure in a third embodiment, FIG. 5 a block diagram of a transmission assembly according to the disclosure in a fourth embodiment, FIG. 6 a gearset layout of the first embodiment of the transmission assembly, FIG. 7 a shift matrix of the first, second, and third embodiments of the transmission assembly, FIG. 8 a shift matrix of the fourth embodiment of the transmission assembly, FIG. 9 a flow of power shown in the gearset layout of the first embodiment of the transmission assembly, FIG. 10 a flow of power shown in the gearset layout of the first embodiment of the transmission assembly, FIG. 11 a block diagram of a transmission assembly according to the disclosure in a fifth embodiment, FIG. 12 a gearset layout of the fifth embodiment of the transmission assembly, FIG. 13 a shift matrix of the fifth embodiment of the transmission assembly, FIG. 14 a flow of power shown in the gearset layout of the fifth embodiment of the transmission assembly, and FIG. 15 a flow of power shown in the gearset layout of the fifth embodiment of the transmission assembly.

FIG. 2 shows a block diagram of a transmission assembly 28 according to the disclosure in a first embodiment. The transmission assembly includes a main shift transmission in the form of a parallel shift transmission 50 and a planetary gear 40. The parallel shift transmission 50 can be designed, as shown above, with a speed-reducer construction.

The planetary gear 40 has an input shaft 30 driven by the drive motor 22 shown in FIG. 1, starting from which a flow of power can be transmitted, as required, to switchable shift elements $42_1$, $42_2$, $42_3$. By means of the shift element $42_1$, the flow of power can be transmitted to a differential shaft 44—which can be constructed as a planet wheel carrier—of the planetary gear 40 and a first connection shaft $52_1$ of the main shift transmission 50. By means of the shift element $42_2$, the flow of power can be transmitted to a sum shaft 46—which can be constructed as an annulus gear—of the planetary gear 40. By means of the shift element $42_3$, the flow of power can be transmitted to a differential shaft 48—which can be constructed as a sun gear—of the planetary gear 40 and a second connection shaft $52_2$ of the main shift transmission 50.

Starting from the first connection shaft $52_1$, the flow of power can be distributed via two spur gear stages $60_1$, $60_2$ to a shift point $62_1$, wherein the shift point $62_1$ can bring, in turn, a speed-reducer shaft 64 into a drive connection with the spur gear stages $60_1$, $60_2$. In addition, starting from the first connection shaft $52_1$, the flow of power can be distributed via an additional two spur gear stages $66_1$, $66_2$ to a shift point $62_2$, wherein the shift point $62_2$ can bring, in turn, a speed-reducer shaft 68 into a drive connection with the spur gear stages $66_1$, $66_2$.

Furthermore, from the second connection shaft $52_2$, the flow of power can be distributed via two spur gear stages $70_1$, $70_2$ to a shift point $72_1$, wherein the shift point $72_1$ can bring, in turn, a speed-reducer shaft 68 into a drive connection with the spur gear stages $70_1$, $70_2$. In addition, starting from the second connection shaft $52_2$, the flow of power can be distributed via two additional spur gear stages $74_1$, $74_2$ to a shift point $72_2$, wherein the shift point $72_2$ can bring, in turn, a speed-reducer shaft 68 into a drive connection with the spur gear stages $66_1$, $66_2$.

Starting from the speed-reducer shaft 64, the flow of power can be transmitted via a shift point 76 either via a double spur gear stage 78 or a spur gear stage 80 to an output shaft 82 of the main shift transmission 50. The double spur gear stage 78 generates a change in the direction of rotation and is used in connection with the transmission-ratio stages driven by means of the speed-reducer shaft 64 for forming the reverse gears. Starting from the speed-reducer shaft 68, the flow of power can be transmitted via a spur gear stage 84 to the output shaft 82 of the main shift transmission 50. From the output shaft 82, the flow of power is transmitted via another spur gear stage 86 to a driven shaft 88 and further to the axle transmission 100.

The embodiment of the main shift transmission shown in FIG. 2 has eight transmission-ratio stages, wherein the even gears 2, 4, 6, 8 receive their flow of power via the first connection shaft $52_1$, and the odd gears 1, 3, 5, 7 receive their flow of power accordingly via the second connection shaft $52_2$. Alternatively, the main shift transmission 50 can also have a number of transmission-ratio stages that is different from eight, for example, ten or twelve transmission-ratio stages. An odd total number of gears could also be possible.

Figure 3:
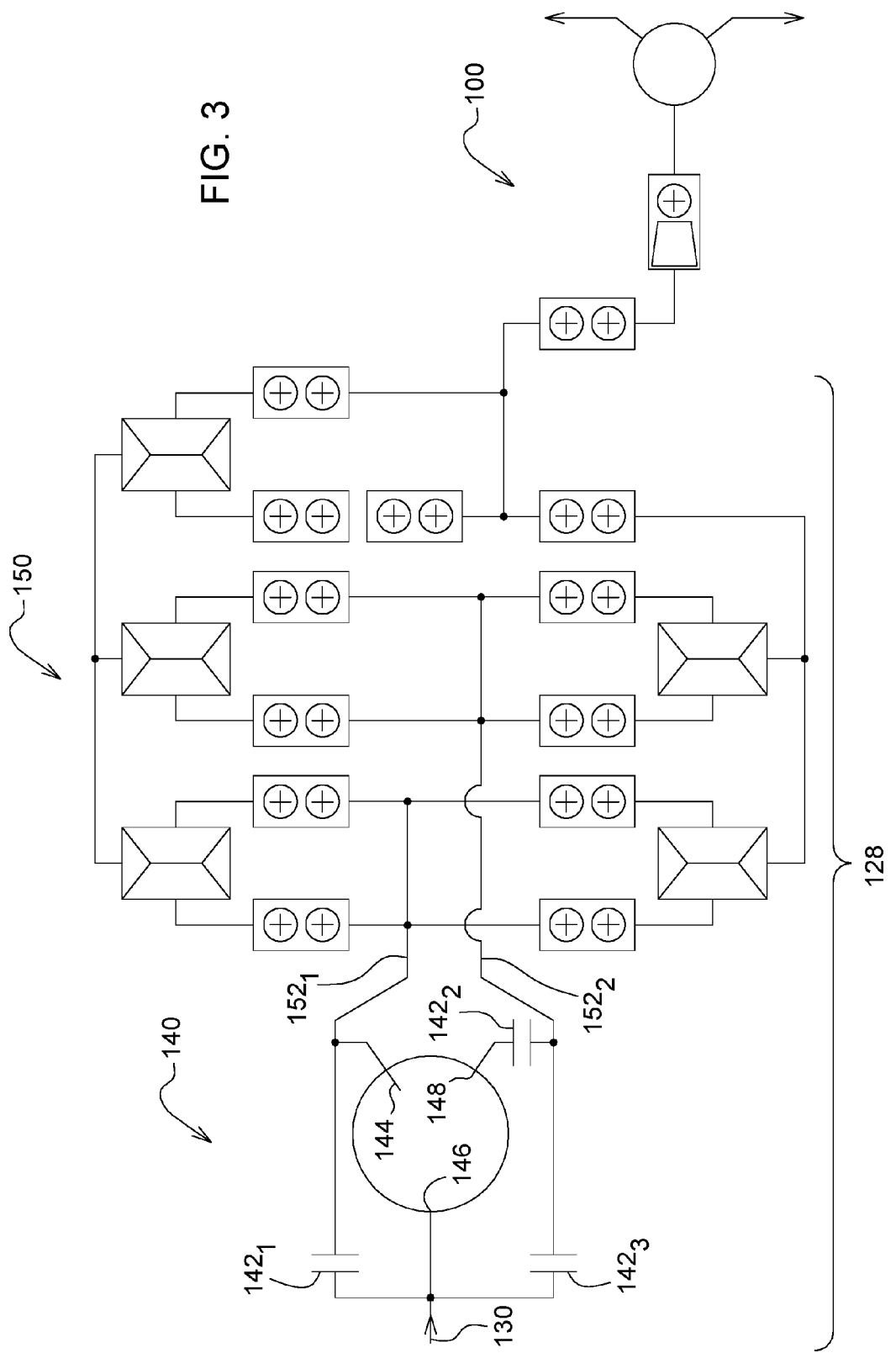

FIG. 3 shows a block diagram of another construction of the transmission assembly, wherein only the deviations relative to the construction shown in FIG. 2 are described and the reference symbols are increased by the count 100. Starting from the input shaft 130, the flow of power is transmitted directly to the sum shaft 146, which can be constructed as an annulus gear. Via the shift element $142_1$, the flow of power can be transmitted to the differential shaft 144—which can be constructed as a planet wheel carrier—of the planetary gear 140 and the first connection shaft $152_1$ of the main shift transmission 150. Via the shift element $142_3$, the flow of power can be transmitted to the differential shaft 148—which can be constructed as a sun gear—of the planetary gear 140 and the second connection shaft $152_2$ of the main shift transmission 150. Via the differential shaft 148, the flow of power can be transmitted via the shift element $142_2$ to the second connection shaft $152_2$.

Figure 4:
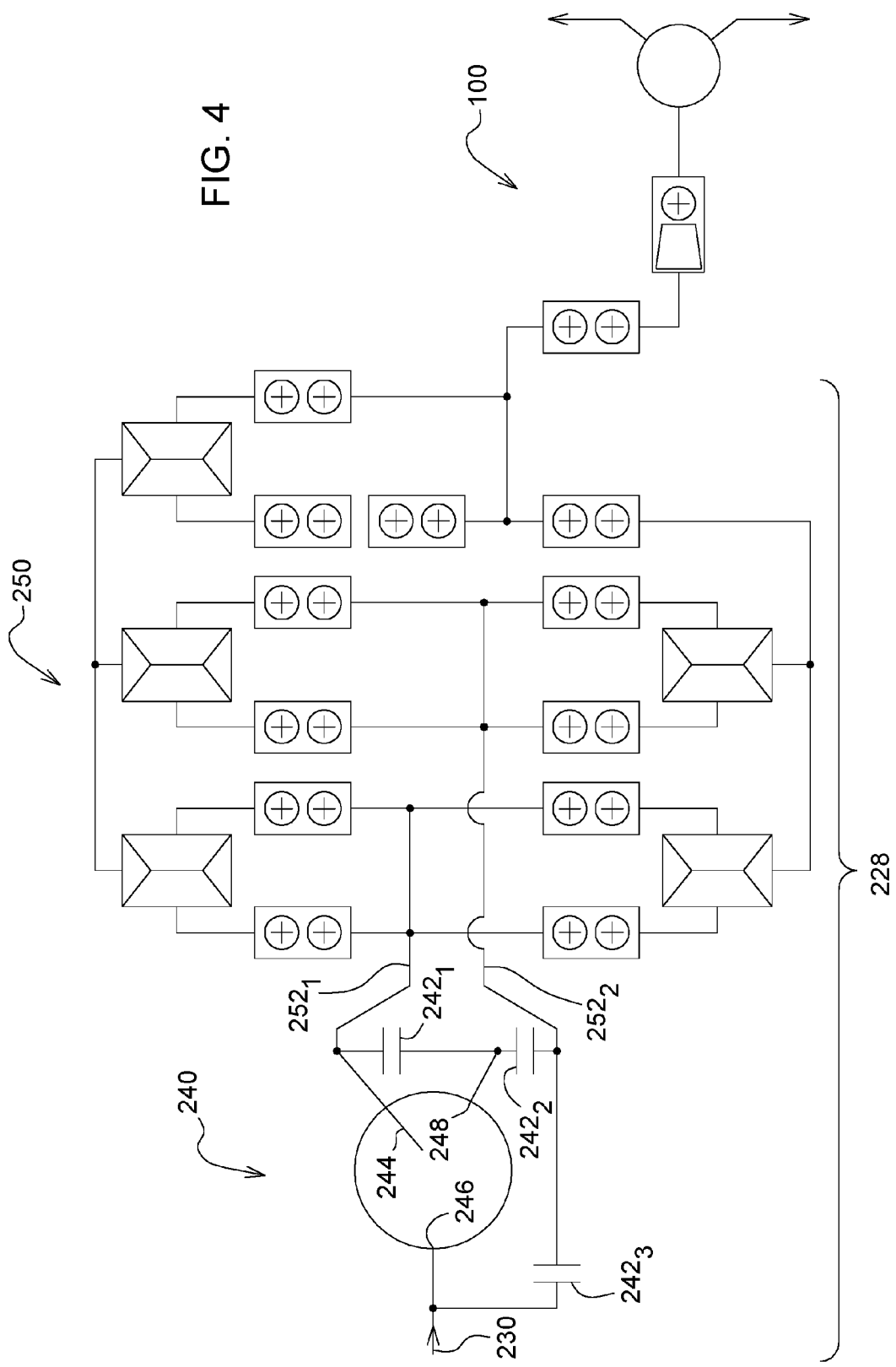

FIG. 4 shows a block diagram of another construction of the transmission assembly, wherein only the deviations relative to the construction shown in FIG. 3 are described and the reference symbols are increased another time by the count 100. The shift point $242_1$ is arranged predominantly between the differential shaft 248 and the differential shaft 244 of the planetary gear 240.

Figure 5:
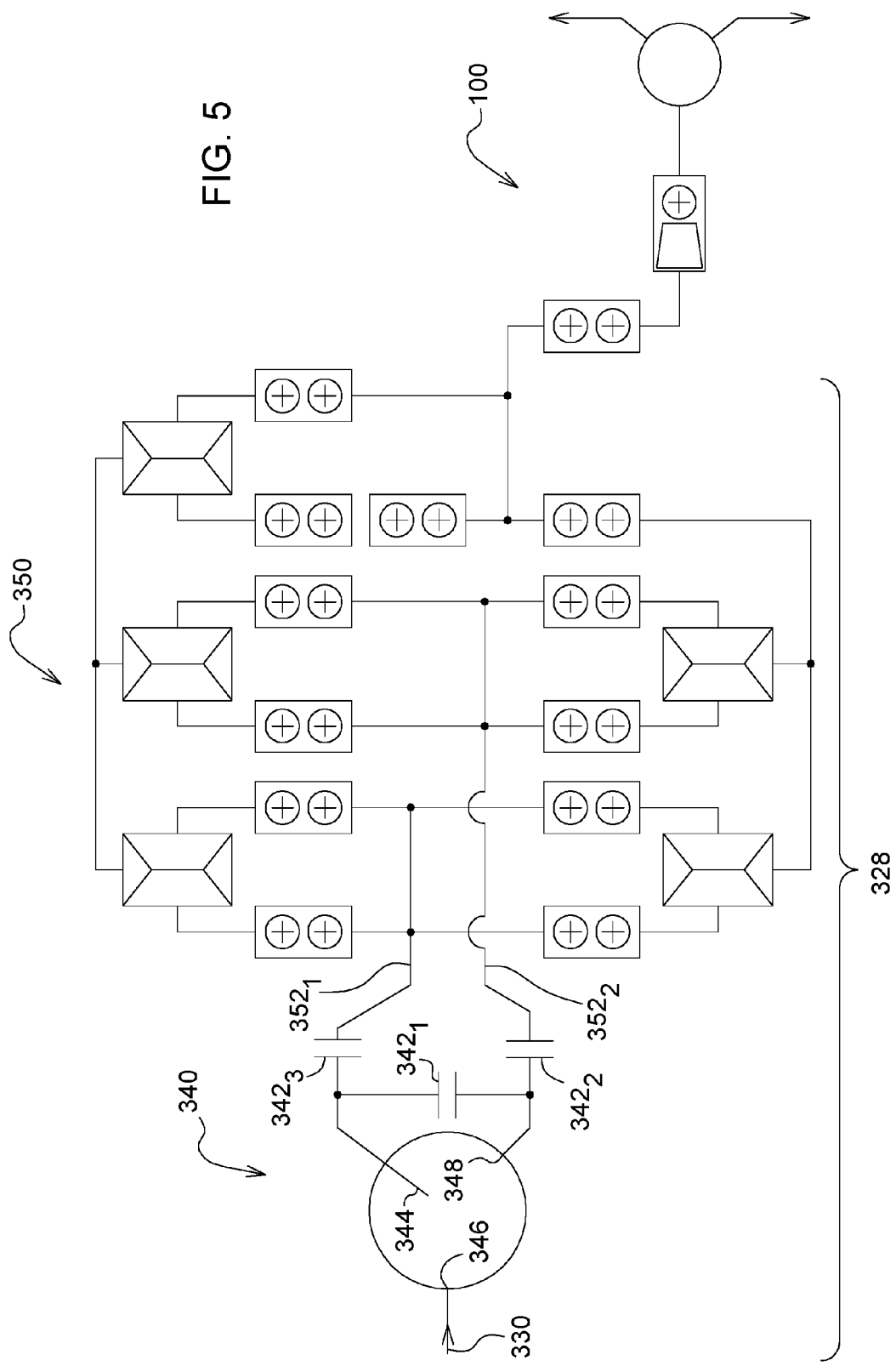

FIG. 5 shows a block diagram of another construction of the transmission assembly, wherein only the deviations relative to the construction shown in FIG. 4 are described and the reference symbols are increased another time by the count 100. While the shift point $342_1$ is further arranged between the differential shaft 348 and the differential shaft 344 and the shift point $342_2$ is arranged between the differential shaft 348 and the second connection shaft $352_2$, the shift point $342_3$ is here arranged between the differential shaft 344 and the first connection shaft $352_1$.

Figure 6:
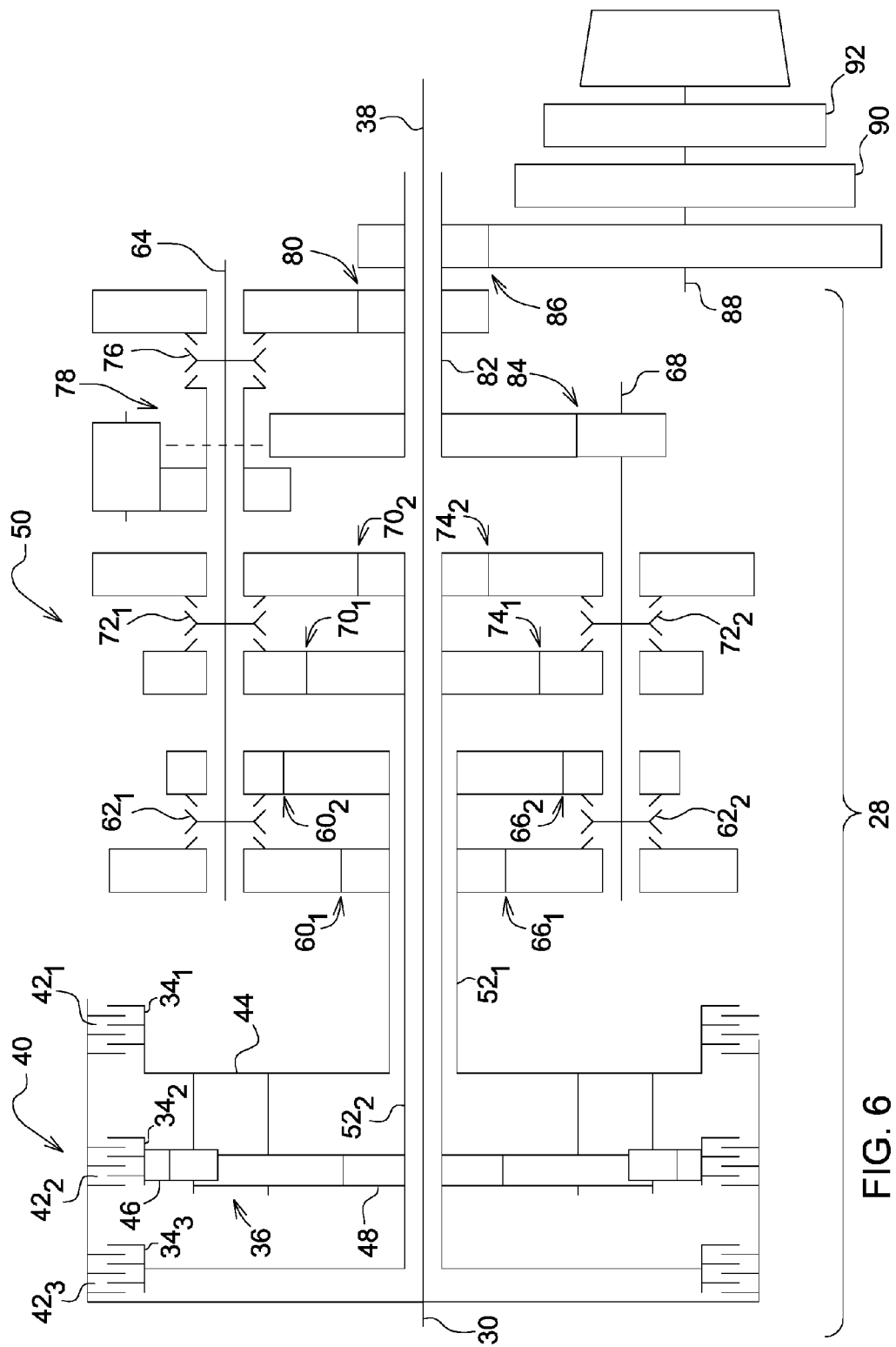

FIG. 6 shows a gearset layout of the construction described in connection with FIG. 2 for the transmission assembly 28. To be seen is first that the shift points $42_1$, $42_2$, $42_3$ can be constructed as multiple-disk clutches. The multiple-disk clutches $42_1$, $42_2$, $42_3$ have a common outer clutch cage 32. Via the clutch hub $34_3$ of the shift point $42_3$, the sun gear 48 of the planetary gear 40 and the second connection shaft $52_2$ of the main shift transmission 50 can be driven. The annulus gear 46 of the planetary gear 40 is driven via the clutch hub $34_2$ of the shift point $42_2$. The planet wheel carrier 44 and the first connection shaft $52_1$ of the main shift transmission 50 are driven via the clutch hub $34_1$ of the shift point $42_1$. The planetary gear 40 can be constructed as a double planet transmission with double planet wheels 36. The second connection shaft $52_2$ can be arranged within the first connection shaft $52_1$. Furthermore, within the connection shafts $52_1$, $52_2$ there can be a secondary driven shaft 38 driven directly by the drive motor 22—see FIG. 1—and provided, for example, for driving a power take-off, not shown in more detail, of the vehicle 10. With respect to the main shift transmission 50, reference is made to FIG. 2. FIG. 6 further shows that a first driven gear 90 and a second driven gear 92 can be allocated to the driven shaft 88. The first driven gear 90 can be part of a front wheel drive that can be engaged as required and the second driven gear 92 can be part of a parking lock of the vehicle 10.

FIG. 7 shows a shift matrix of the embodiments of the transmission assembly described in FIGS. 2 to 4. The shift matrix first numbers, in the leftmost column, "Gear total," the gear stages of the transmission assembly 28, which are formed by the interaction of the respective transmission-ratio stage of the planetary gear 40 and the main shift transmission 50. In the second column from the left, "Transmission-ratio stage in 50," the shift states of the main shift transmission 50 resulting from the transmission-ratio stages are listed. In the next columns to the right, the shift states of the shift points of the planetary gear 40 and the main shift transmission 50 are indicated. The label "X" means that a flow of power is transmitted, and the label "N" means that no flow of power is transmitted. Furthermore, the numbers with the subscript indexes, e.g. $74_2$, indicate the spur gear stage of the main shift transmission 50, via which the flow of power is transmitted through the corresponding shift point.

In the column "Transmission-ratio stage in 50," there is a number in every second row, namely 0 to 8. In the rows between, an "a" is recorded. While the transmission-ratio stages designated with 0 to 8 are so-called direct gears, which are formed without a transmission ratio in the planetary gear 40, so-called intermediate gears are designated with "a," and are formed by the superimposition of a transmission ratio of the main shift transmission 50 with a transmission ratio of the planetary gear 40. The column "Shift points in 40" shows that in each gear, only one of the three shift points $42_1$, $42_2$, $42_3$ is closed at one time and transmits a flow of power. Furthermore, the column "Transmission-ratio stage in 50" shows that, below the transmission-ratio stage 1, there is an intermediate gear a and the transmission-ratio stage 0. These are, starting from the transmission-ratio stage 1, gears that are engaged one by one.

FIG. 8 shows a shift matrix of the embodiment of the transmission assembly described in FIG. 5. The sole difference with the shift matrix shown in FIG. 7 consists in that here, two of the shift points $42_1$, $42_2$, $42_3$ of the planetary gear 40 are closed simultaneously in order to transmit a flow of power. Otherwise, reference is made to the description for the shift matrix shown in FIG. 7.

Figure 9:
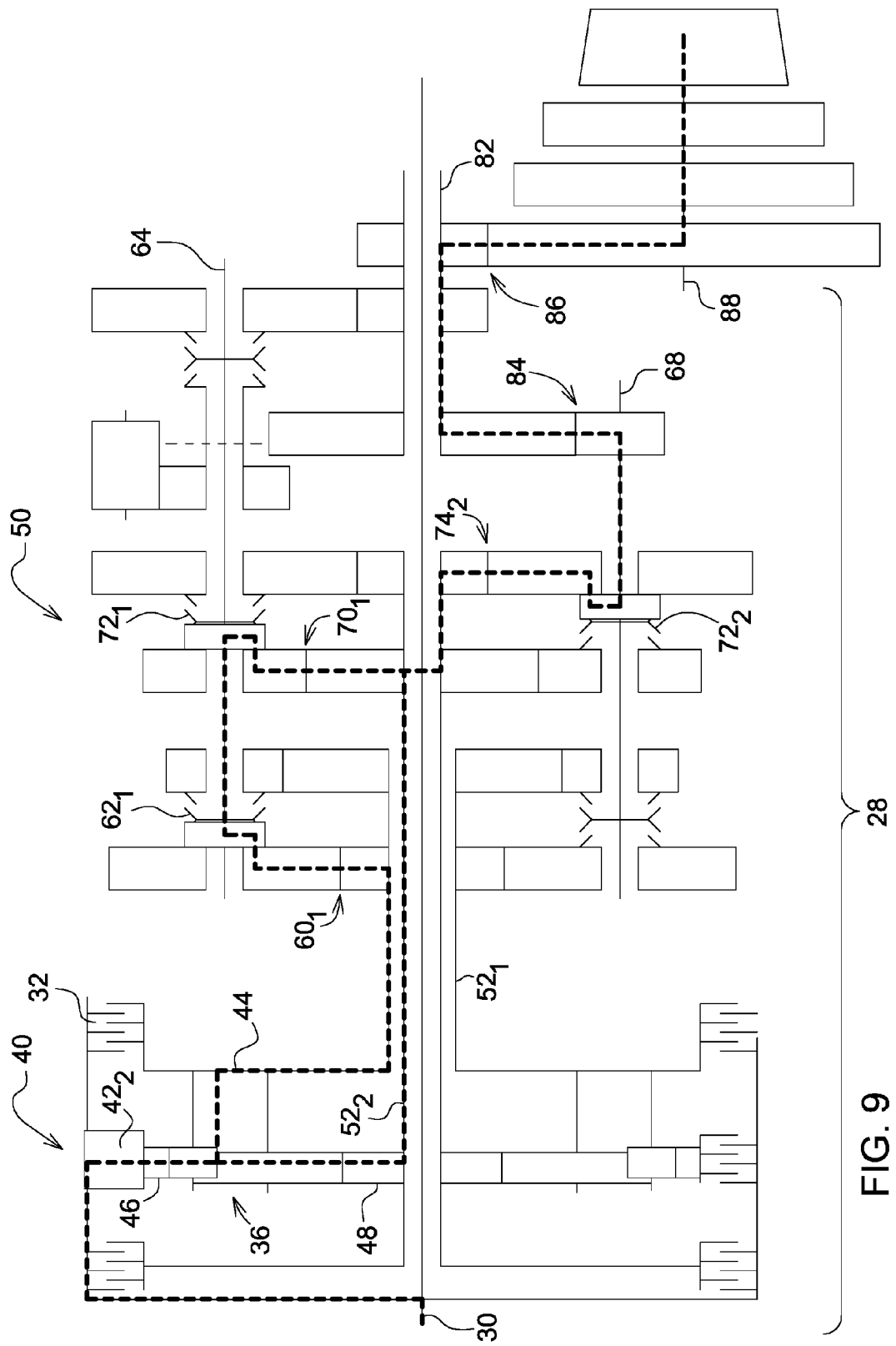

FIG. 9 shows a flow of power drawn in the gearset layout for the embodiments of the transmission assembly described in FIGS. 2 to 4, whose shift matrix is shown in FIG. 7. FIG. 9 shows the gear 2 listed in the shift matrix in the column "Gear total." Gear 2 is an intermediate gear that produces a transmission ratio both in the planetary gear 40 and also in the main shift transmission 50. The flow of power runs, starting from the input shaft 30, via the shift point $42_2$ into the planetary gear 40. In the planetary gear 40, the flow of power branches into two parallel power paths, wherein a first power path runs via the planet wheel carrier 44 to the first connection shaft $52_1$ and a second power path runs via the sun gear 48 to the second connection shaft $52_2$. While the first power path runs from the first connection shaft $52_1$ via the spur gear stage $60_1$, the first speed-reducer shaft 64, and the spur gear stage $70_1$ to the second connection shaft $52_2$, the second power path $52_2$ remains on the second connection shaft $52_2$, in order to reconnect there with the first power path to form one power path. This one power path then runs further via the spur gear stage $74_2$ to the second speed-reducer shaft 68, then further via the spur gear stage 84 to the output shaft 82. In summary, it can be said that the flow of power in the gear 2 of the transmission assembly 28 undergoes both a power branching into multiple power paths, and also a winding through the main shift transmission 50. Here, winding should be understood as a course of the flow of power that runs, starting from one of the connection shafts, via two spur gear stages to the other connection shaft.

Figure 10:
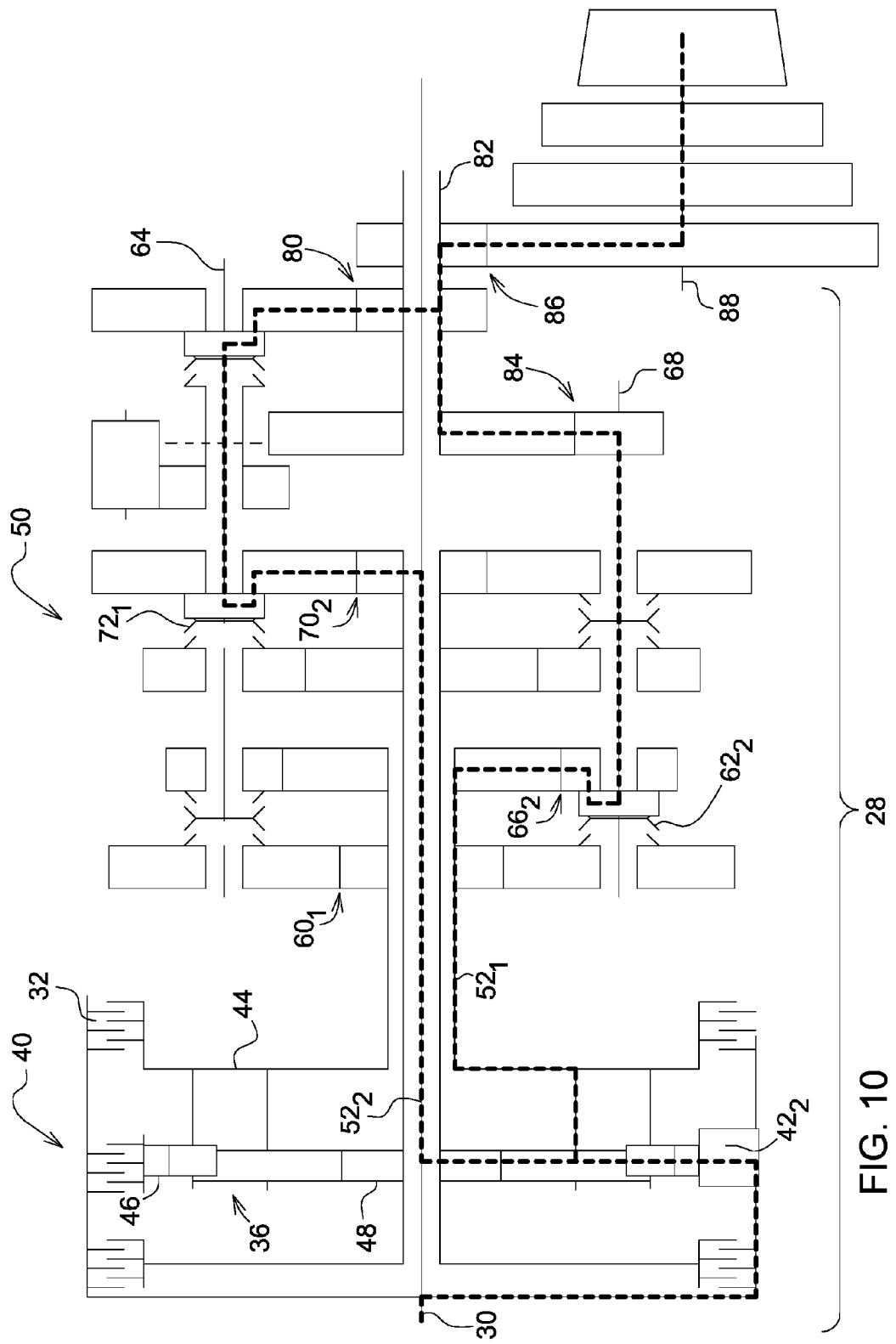

FIG. 10 shows the gear 10 listed in the shift matrix in the column "Gear total." Gear 10 is an intermediate gear that produces a transmission ratio both in the planetary gear 40 and also in the main shift transmission 50. The flow of power runs, starting from the input shaft 30, via the shift point $42_2$ into the planetary gear 40. In the planetary gear 40, the flow of power branches into two parallel power paths, wherein a first power path runs via the planet wheel carrier 44 to the first connection shaft $52_1$ and a second power path runs via the sun gear 48 to the second connection shaft $52_2$. From the first connection shaft $52_1$, the flow of power runs via the spur gear stage $66_2$ and the shift point $62_2$ to the speed-reducer shaft 68. From the second connection shaft $52_2$, the flow of power runs via the spur gear stage $70_2$ and the shift point $72_1$ to the speed-reducer shaft 64. From the speed-reducer shafts 64, 68, the two power paths run, on one side, via the spur gear stage 80 and, on the other side, via the spur gear stage 84 to the output shaft 82, where the two power paths join to form one flow of power again. In summary, it can be said that the flow of power in the gear 10 of the transmission assembly 28 undergoes a power branching in the planetary gear 40 and, in this way, multiple power paths are produced through the main shift transmission 50.

Figure 11:
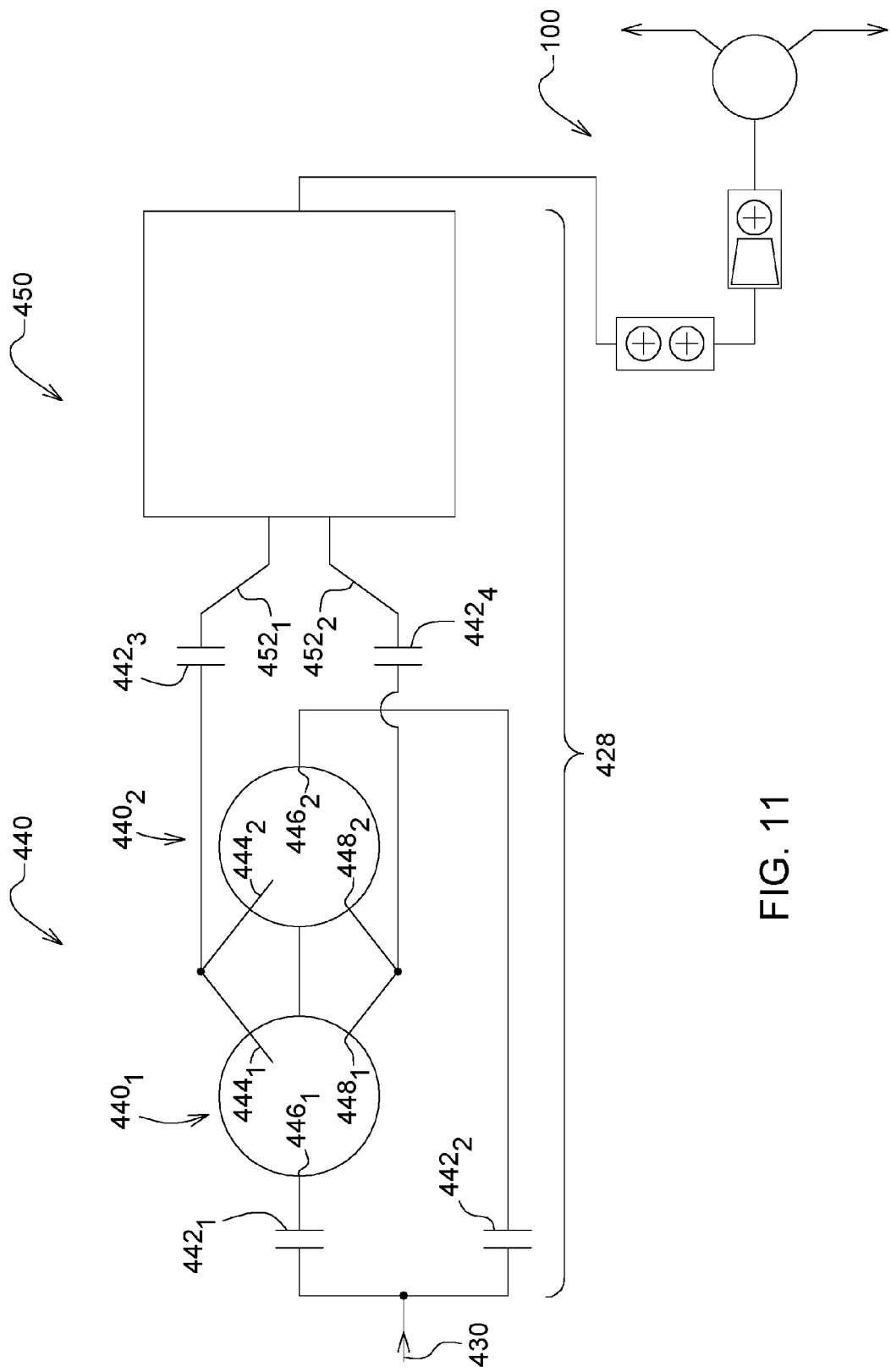

FIG. 11 shows a block diagram of a transmission assembly 428 according to the disclosure in another embodiment, wherein only the deviations relative to the constructions shown in FIGS. 2 to 5 are described and the reference symbols are increased another time by the count 100. The transmission assembly 428 shown in FIG. 11 differs from the assemblies shown in FIGS. 2 to 5 by a planetary gear, which includes two planet wheel transmissions $440_1$, $440_2$ interlocked with each other. Otherwise the main shift transmission 450 is not changed. Starting from the input shaft 430, the sum shaft $446_1$—which can be constructed as an annulus gear—of the planet wheel transmission $440_1$ can be driven via the shift point $442_1$, and the sum shaft $446_2$—which can be constructed as a sun gear—of the planet wheel transmission $440_2$ can be driven via the shift point $442_2$. The two planet wheel transmissions $440_1$, $440_2$ are connected to each other such that the first differential shafts $444_1$, $444_2$—which can be constructed as planet wheel carriers—are each connected to each other, and the second differential shafts $448_1$, $448_2$—which can be constructed as sun gears—are each connected to each other. Starting from the first differential shafts $444_1$, $444_2$, a flow of power can be transmitted via the shift point $442_3$ to the first connection shaft $452_1$. Starting from the second differential shafts $448_1$, $448_2$, a flow of power can be transmitted via another shift point $442_4$ to the second connection shaft $452_2$. In summary, it can be said that the embodiment of the transmission assembly 428 described in FIG. 11 is characterized by a planetary gear 440 with two planet wheel transmissions $440_1$, $440_2$ and four shift points $442_1$, $442_2$, $442_3$, $442_4$. In a simplified but alternative variant, the third and fourth shift point $442_3$, $442_4$ can be eliminated at the cost of load switching capability.

Figure 12:
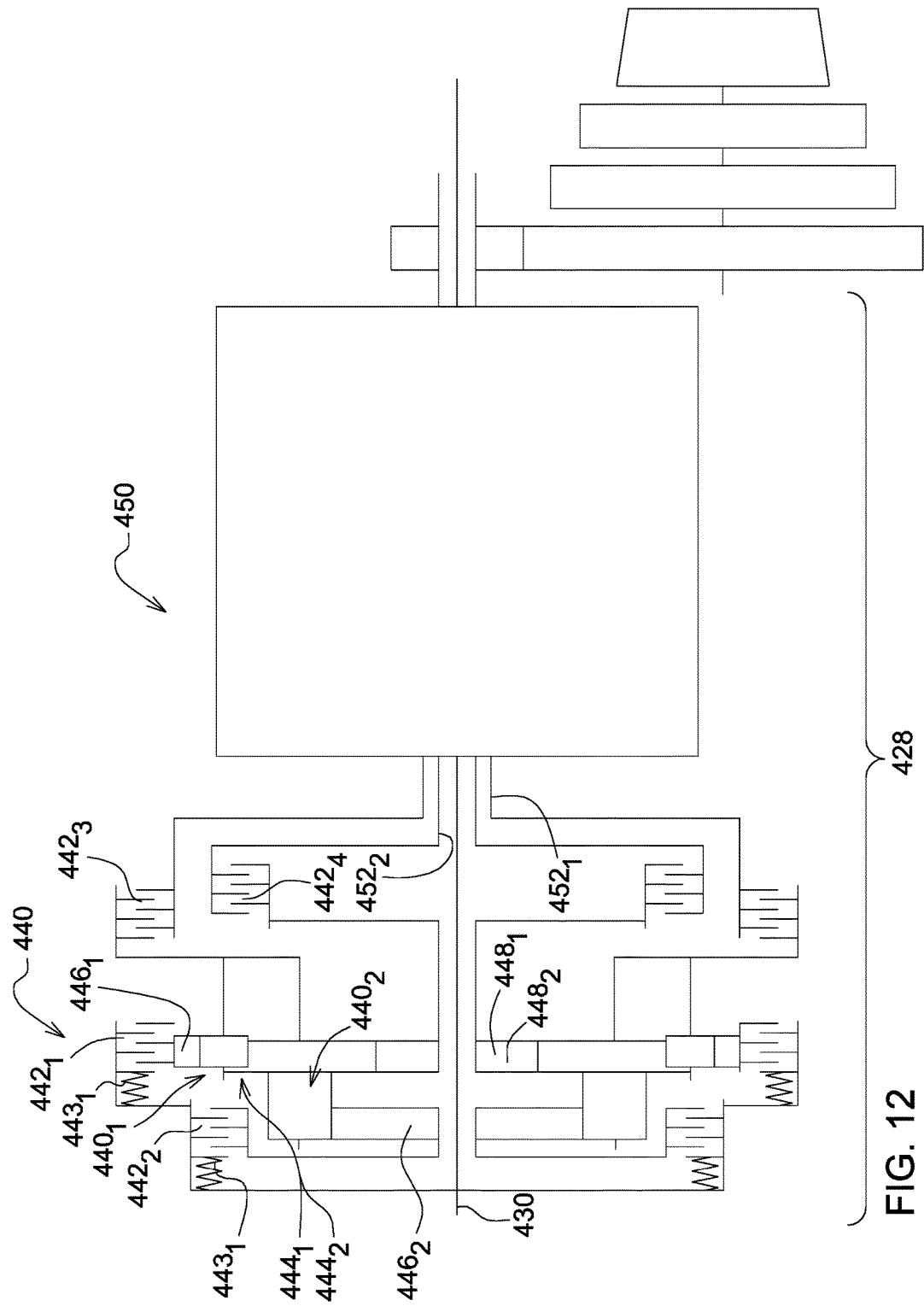

FIG. 12 shows a gearset layout of the construction described in connection with FIG. 11 for the transmission assembly 428. To be seen is initially that the shift points $42_1$, $42_2$, $42_3$, $43_4$ can be constructed as multiple-disk clutches. To be seen is that a compressive spring $443_1$, $443_2$ is allocated to each of the two shift points $442_1$, $442_2$, wherein these springs load the shift points $442_1$, $442_2$ into a closed shift position. This means that the shift points $442_1$, $442_2$ interrupt a flow of power when actuated, for example, by means of hydraulic pressure, and otherwise the flow of power is transmitted.

FIG. 13 shows a shift matrix of the embodiment described in FIG. 11 for the transmission assembly 428. The structural design of the shift matrix in FIG. 13 is to the same as the design of the shift matrixes in FIGS. 7 and 8, insofar as reference is made to their description and at this point only the differences will be described. The shift matrix in FIG. 13 shows a number, namely 0 to 8, in the column "transmission-ratio stage in 50" in every third row. In the rows between, there is an "a" or a "b." While the transmission-ratio stages designated with 0 to 8 are so-called direct gears that are realized without a transmission ratio in the planetary gear 40, with "a" and "b" so-called intermediate gears are designated that are realized by a superposition of a transmission ratio of the main shift transmission 50 with a transmission ratio of the planetary gear 40. The column "shift points in 40" shows that, in each gear, three of the four shift points $42_1$, $42_2$, $42_3$, $42_4$ are closed at one time and transmit a flow of power. Furthermore, the column "transmission-ratio stage in 50" shows that, below the transmission-ratio stage 1, an intermediate gear a, an intermediate gear b, and the transmission-ratio stage 0 are arranged. Starting from the transmission-ratio stage 1, these are gears shifted one by one.

Figure 14:
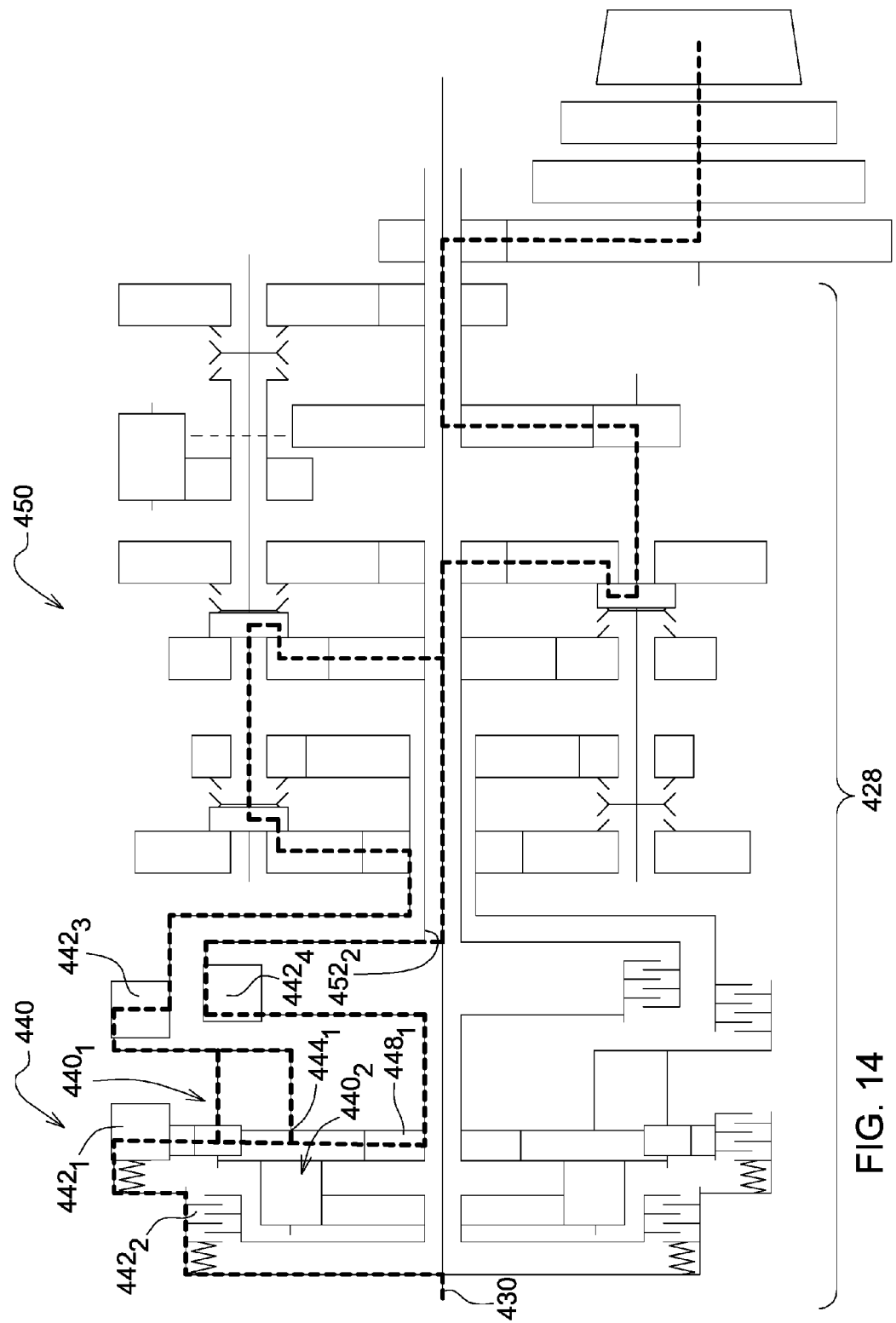

FIG. 14 shows the flow of power of the embodiment described in FIG. 11 for the transmission assembly 428, whose shift matrix is shown in FIG. 13. FIG. 9 shows the gear 2 listed in the shift matrix in the column "Gear total." Gear 2 is an intermediate gear that produces a transmission ratio both in the planetary gear 440 and also in the main shift transmission 450. The flow of power runs starting from the input shaft 430 via the closed shift point $442_1$ into the planet wheel transmission $440_1$. Because the shift point $442_2$ is open, no flow of power is transmitted through this point into the planet wheel transmission $440_2$. In the planet wheel transmission $440_1$, the flow of power branches out, with one power path running via one of the first differential shafts $444_1$ and another power path running via one of the second differential shafts $448_1$. With respect to the other course of the flow of power within the main shift transmission 450 and the joining of the two power paths, refer to FIG. 9. In summary, it can be said that the flow of power in the gear 2 of the transmission assembly 428 undergoes both a branching of the power into multiple power paths and also a winding through the main shift transmission 450.

Figure 15:
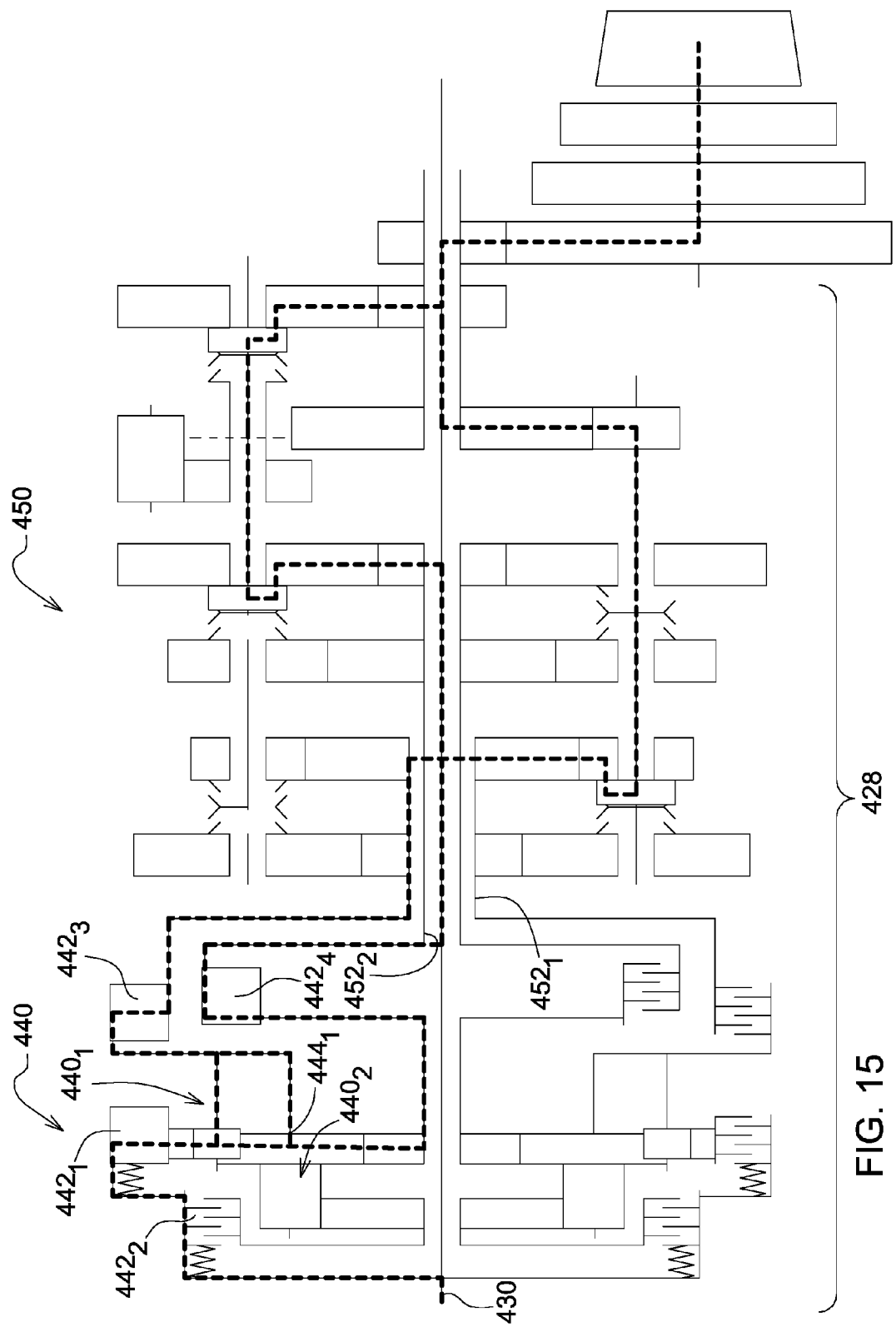

FIG. 15 shows the gear 14 listed in the shift matrix of FIG. 13 in the column "Gear total." The gear 14 is an intermediate gear that creates a transmission ratio both in the planetary gear 440 and also in the main shift transmission 450. In terms of the flow of power within the planetary gear 440, refer to the description of FIG. 14, and in terms of the flow of power within the main shift transmission 450 and the joining of the two power paths, refer to FIG. 10. In summary, it can be said that the flow of power in the gear 14 of the transmission assembly 428 undergoes a power branching in the planetary gear 440 and here produces multiple power paths through the main shift transmission 450.

LIST OF REFERENCE SYMBOLS

10 Vehicle
12 Cabin
14 Front vehicle axle
20 Drive train
22 Drive motor
24 Traction drive
26 Rear vehicle axle
28 Transmission assembly
30 Input shaft
32 Clutch cage
34 Clutch hub
36 Double planet wheel
38 Auxiliary driven shaft
40 Planetary gear
42 Shift point
44 Planet wheel carrier
46 Annulus gear
48 Sun gear
50 Main shift transmission
52 Connection shaft
60 Spur gear stage
62 Shift point
64 Speed-reducer shaft
66 Spur gear stage
68 Speed-reducer shaft
70 Spur gear stage
72 Shift point
74 Spur gear stage
76 Shift point
78 Spur gear stage
80 Spur gear stage
82 Output shaft
84 Spur gear stage
86 Spur gear stage
88 Driven shaft
90 Driven gearwheel
92 Driven gearwheel
100 Axle transmission

The invention claimed is:

1. A transmission assembly for a drive train of a vehicle for connecting a drive motor to a traction drive of the vehicle, comprising:
   a main shift transmission with multiple transmission-ratio stages, wherein by a shifting by means of shift elements of the one or more transmission-ratio stages, multiple shift states of the main shift transmission can be established,
   a planetary gear, wherein the main shift transmission and the planetary gear are drivingly connected to each other or can be connected by means first and second connection shafts, wherein, in one or more of the shift states of the main shift transmission, a flow of power runs from the drive motor in at least one section of the transmission assembly by means of multiple branched power paths to the traction drive, wherein, in at least one of the shift states, the flow of power runs in one of the branched power paths via at least two shift elements, and wherein in at least one of the shift states, the flow of power runs in one of the branched power paths from one of the first and second connection shafts to the other of the first and second connection shafts.

2. The transmission assembly of claim 1, wherein the shift elements are constructed as positive-locking shift elements.

3. The transmission assembly of claim 1, wherein the flow of power runs from one of the first and second connection shafts via at least one of the transmission-ratio stages to the other of the first and second connection shafts.

4. The transmission assembly of claim 1, wherein the planetary gear comprises four connection shafts, of which the first and the second connection shafts can each be connected to an input shaft or an output shaft by means of one of the shift elements to a connection shaft of the transmission assembly, and the third connection shaft can be connected to one of the first and second connection shafts of the main shift transmission, and the fourth connection shaft can be connected to the other of the first and second connection shafts of the main shift transmission.

5. The transmission assembly of claim 4, wherein the third connection shaft can be connected via one of the shift elements to one of the first and second connection shafts of the main shift transmission, and the fourth connection shaft can be connected via one of the shift elements to the other of the first and second connection shafts of the main shift transmission.

6. The transmission assembly of claim 1, wherein the main shift transmission is constructed as a parallel shift transmission.

7. The transmission assembly of claim 6, wherein the main shift transmission is configured as a speed-reducer with two speed-reducer shafts.

* * * * *